United States Patent
Halfon et al.

(10) Patent No.: US 9,103,946 B2
(45) Date of Patent: Aug. 11, 2015

(54) WIND PARAMETER INDICATION

(71) Applicant: VENTUS-PRODUCT DEVELOPMENT & CONSULTING LTD., Nes Tziyona (IL)

(72) Inventors: Itzhak Halfon, Nes Tziyona (IL); Yaniv Glozman, Nes Tziyona (IL); Itay Galim, Nes Tziyona (IL)

(73) Assignee: VENTUS-PRODUCT DEVELOPMENT & CONSULTING LTD., Nes Tziyona (IL)

( * ) Notice: Subject to any disclaimer, the term of this patent is extended or adjusted under 35 U.S.C. 154(b) by 0 days.

(21) Appl. No.: 14/373,719

(22) PCT Filed: Jan. 14, 2013

(86) PCT No.: PCT/IL2013/050036
§ 371 (c)(1),
(2) Date: Jul. 22, 2014

(87) PCT Pub. No.: WO2013/118112
PCT Pub. Date: Aug. 15, 2013

(65) Prior Publication Data
US 2015/0027220 A1 Jan. 29, 2015

(30) Foreign Application Priority Data
Feb. 7, 2012 (IL) .......................................... 217985

(51) Int. Cl.
*G01W 1/08* (2006.01)
*G05D 1/00* (2006.01)
(Continued)

(52) U.S. Cl.
CPC . *G01W 1/02* (2013.01); *B64D 1/08* (2013.01); *B64D 17/00* (2013.01); *B64D 45/00* (2013.01);
(Continued)

(58) Field of Classification Search
CPC .................................. G01W 1/08; G05D 1/00
USPC ...................................................... 73/170.01
See application file for complete search history.

(56) References Cited

U.S. PATENT DOCUMENTS

| 4,080,925 A | 3/1978 | Moore |
| 5,179,907 A | 1/1993 | Galbraith |

(Continued)

FOREIGN PATENT DOCUMENTS

EP 2009458 A1 12/2008

OTHER PUBLICATIONS

International Search Report dated Aug. 15, 2013 issued for International Application No. PCT/IL2013/050036.
(Continued)

*Primary Examiner* — Lisa Caputo
*Assistant Examiner* — Jamel Williams
(74) *Attorney, Agent, or Firm* — Paul D. Bianco; Martin Fleit; Fleit Gibbons Gutman Bongini & Bianco PL (57) ABSTRACT

Wind parameter indication device and method for providing an indication of wind speed and wind direction. The device is deployed along an aerial trajectory toward a ground surface, such as after being ejected from an aircraft in flight. The device includes an anemometer, an altimeter, a compass, a processor and a transmitter. The anemometer obtains local wind speed and local wind direction measurements along the trajectory. The altimeter obtains altitude measurements along the trajectory. The compass obtains direction measurements along the trajectory. The device may further include an accelerometer, for obtaining acceleration measurements along the trajectory. The processor determines a wind speed value and a wind direction value associated with a predetermined altitude of the device. The transmitter transmits the determined wind speed value and wind direction value to a remotely located receiver. The device may further include a stabilizing decelerator to stabilize and decelerate the device along the trajectory.

20 Claims, 6 Drawing Sheets

(51) Int. Cl.
- *G01W 1/02* (2006.01)
- *G01S 17/02* (2006.01)
- *G01S 17/88* (2006.01)
- *G01S 17/95* (2006.01)
- *G01S 19/15* (2010.01)
- *G01S 7/00* (2006.01)
- *G01S 19/14* (2010.01)
- *B64D 1/08* (2006.01)
- *B64D 17/00* (2006.01)
- *B64D 45/00* (2006.01)
- *G01C 5/00* (2006.01)
- *G01C 17/00* (2006.01)
- *G01F 1/76* (2006.01)

(52) U.S. Cl.
CPC ...... *G01C 5/00* (2013.01); *G01C 17/00* (2013.01); *G01F 1/76* (2013.01); *G01S 7/003* (2013.01); *G01S 17/023* (2013.01); *G01S 17/88* (2013.01); *G01S 17/95* (2013.01); *G01S 19/14* (2013.01); *G01S 19/15* (2013.01); *G01W 1/08* (2013.01)

(56) References Cited

U.S. PATENT DOCUMENTS

| | | | |
|---|---|---|---|
| 5,645,248 A * | 7/1997 | Campbell | 244/30 |
| 5,657,009 A * | 8/1997 | Gordon | 340/968 |
| 6,154,143 A * | 11/2000 | Robinson | 340/601 |
| 6,378,820 B1 | 4/2002 | Mooney et al. | |
| 6,748,896 B2 | 6/2004 | Hunsley | |
| RE38,584 E * | 9/2004 | Robinson | 340/601 |
| 7,574,973 B2 | 8/2009 | Markham | |
| 7,945,356 B2 | 5/2011 | Wilkens, Jr. | |
| 2003/0126774 A1* | 7/2003 | Lim et al. | 40/412 |
| 2003/0197095 A1* | 10/2003 | Preston | 244/152 |
| 2009/0005921 A1* | 1/2009 | Wilkens et al. | 701/18 |
| 2009/0326792 A1* | 12/2009 | McGrath | 701/120 |
| 2011/0021293 A1* | 1/2011 | York et al. | 473/407 |

OTHER PUBLICATIONS

International Preliminary Report on Patentability dated Apr. 13, 2014 issued for International Application No. PCT/IL2013/050036.

* cited by examiner

WIND PARAMETER INDICATION

FIELD OF THE DISCLOSED TECHNIQUE

The disclosed technique generally relates to wind speed and wind direction indicators, and to aircraft landing assistance.

BACKGROUND OF THE DISCLOSED TECHNIQUE

A primary feature of a helicopter is its ability to execute a landing at nearly any location, and does not necessarily require a dedicated runway as with many other types of aircrafts. A typical aircraft landing involves the pilot receiving necessary landing information from operators located at a nearby aircraft control station and/or at an airport at which the landing will take place. If the pilot is landing the aircraft at a remote location where the necessary landing information cannot be acquired from an external source, then the information must be obtained by other means. A crucial component of this information is various parameters relating to the wind conditions at the desired landing point, such as the wind speed and the wind direction. The wind parameters must be known with a sufficiently high degree of accuracy. There may be a significant difference between the local wind conditions at the landing point from those in nearby regions, even when comparing between relatively short distances. Therefore a global value of the wind parameters in the general vicinity of the landing aircraft may not be sufficiently accurate for the landing requirements. Furthermore, the wind parameters are variable and may change abruptly. Various entities or items may suddenly shift to a location along the wind path, which may change or influence the wind parameters. In some situations, the pilot is not aware of the exact landing point well in advance of the actual landing, and may be forced to determine the precise location, or to alter a previously selected landing point, according to various constraints and changing conditions. In addition, the landing point may be at a remote location where there is limited or no access to landing assistance individuals and/or which lacks nearby aircraft control stations (e.g., due to topographical factors, such as a lake, a mountain, or other types of difficult to reach terrain). Such constraints further serve to complicate the ability to accurate the wind parameters and other necessary landing information within a sufficient time period and a sufficient degree of accuracy.

One approach for real-time landing zone signaling, commonly employed by military and paramilitary forces, involves the use of smoke grenades. The emanating smoke can provide the pilot with an indication of the wind direction at the landing point. While smoke grenades are simple to deploy and may be used simultaneously for additional purposes, they are also potentially dangerous due to the contained chemicals and are thus typically restricted to authorized personnel. In addition, a smoke grenade cannot be deployed over water, and once the smoke from a first grenade has fully evaporated, a new grenade must be used. Another approach is to install a portable windsock or other highly visible wind measurement instrument at the landing point in real-time by people on the ground. However, such a windsock is relatively large and requires time to assemble, and thus entails informing the necessary individuals at the actual landing point sufficiently ahead of time.

There are various types of measurement instruments and techniques known in the art for measuring wind speed and wind direction. A wind vane, also known as a "weather vane" or a "weathercock", is generally embodied by an asymmetrically shaped pointer mounted at its center of gravity onto a vertically oriented rod, such that one end of the pointer is oriented along the direction of the wind. The wind vane may also include a compass, such as a four-arm cross denoting the reference directions (North, West, East, South), providing reference axes for the pointer alignment. A related type of instrument is a propeller or windmill anemometer, which has a number of flat or helicoidal vanes rotating along an axis parallel to the direction of the wind. The wind speed can be calculated a function of the angular rotation of the vanes.

A windsock, also known as a "wind sleeve" or "wind cone", is a conical hollow tube made of fabric, which is mounted on a freewheeling pivot such that the tube points away from the direction of the wind blowing through it. Windsocks are typically brightly colored to enhance visibility, and are commonly employed at airports (to assist pilots), at chemical plants (due to risks of gas leakages), and along highways (for vehicle drivers).

A pitot tube is a pressure measurement instrument, consisting of a tube positioned parallel to the direction of a fluid stream and attached to a manometer (pressure gauge), providing a measurement of the fluid flow velocity. A tube anemometer is generally embodied by a U-shaped tube containing a liquid manometer where one end of the tube is bent horizontally facing the wind while the other end remains vertical parallel to the wind flow. The wind blowing into the horizontal tube end increase the pressure on one side of the manometer, while the wind flowing along the vertical tube end barely effects the pressure at the other side, such that the resulting liquid change in the tube provides an indication of the wind speed. Another type of anemometer that operates by measuring wind pressure is a plate anemometer, which is simply a vertically suspended flat plate, where the wind pressure against the plate surface is balanced by a spring. The spring compression determines the force applied by the wind against the plate. Plate anemometers provide poor response to light winds and variable wind conditions, and inaccuracies with strong winds.

A sonic anemometer utilizes ultrasound waves to measure wind speed, based on the propagation time of the ultrasound waves between a pair of transducers. Multiple ultrasonic transducers may be combined to produce a three-dimensional model of the wind flow. Sonic anemometers are well-suited for turbulence measurements due to their high temporal resolution, and are also relatively robust and durable due to a lack of moving parts. However, sonic anemometers are susceptible to inaccuracies during precipitation (e.g., rainy weather), and also may require compensation for the effects of the supporting structure.

A laser Doppler anemometer operates by measuring the reflected backscatter of a transmitted laser beam and the associated Doppler shift. The measured Doppler shift is used to calculate the speed of the particles in the air causing the backscattering, which corresponds to the wind speed in the surrounding area.

A ping-pong ball anemometer involves a simple configuration of a ping-pong ball (or similar lightweight object) suspended from a string. A measure of the angular displacement of the ping-pong ball provides an indication of the wind speed, while the displacement direction corresponds to the wind direction.

U.S. Pat. No. 4,080,925 to Moore, entitled "Portable surface wind indicator", is directed to a portable wind indicator that can be dropped from an aircraft in remote locations. The wind indicator includes a central body member, and a plurality of elongated arms extending outwardly from the central member. Wind indicating means, such as a ribbon or flag, is attached to the outer end of each arm. The arms are spaced and arranged such that when the indicator is dropped from an aircraft, it will land supported by three arms with another arm extending upward into the air for indicating the wind direction.

U.S. Pat. No. 5,179,907 to Galbraith, entitled "Flag and buoy apparatus", is directed to a flotation apparatus to support a flag which may be placed in the water to indicate the presence of a scuba diver. The apparatus includes a body with a plurality of recessed receptacles, a plurality of buoyant arms, a flag, and a pole assembly. Each arm is received in a receptacle and extends radially from the body, while also being tethered to the body. The pole assembly extends axially from the body to support the flag. The arms and the pole assembly may be detached from the body for storage of the apparatus.

U.S. Pat. No. 6,378,820 to Mooney et al, entitled "Apparatus and method for mounting banners", is directed to a mounting apparatus for a banner or outdoor structure, susceptible to tearing by strong wind loads. The apparatus includes an arm and a base. The arm includes a proximal portion, a distal portion for holding a banner, and a spring portion connecting the proximal portion to the distal portion. The base includes a plate, a receiver and straps, and is adapted for attaching the proximal portion of the arm to a pole.

U.S. Pat. No. 6,748,896 to Hunsley, entitled "Streamer flag attachment", is directed to an attachment for providing a visually appealing enhancement to a flag pole. The attachment includes a circular loop that includes an elastic material formed into a closed ring defining a central opening. The attachment further includes a sleeve-like streamer holder attached to the loop, and a plurality of elongated strips of flexible material attached to and extending radially from a portion of the streamer holder. A user can securely mount the attachment by coupling the circular loop around the flag pole and allowing the loop to grip the flag pole surface, thus holding the attachment in place U.S. Pat. No. 7,574,973 to Markham, entitled "Emergency rescue device and method", is directed to a device including an integrated emergency rescue line and reflective locator for visually locating the area of a person to be rescued. The device includes a canister that houses a plurality of reflective strands or ribbons. A strap secures the rescue device to a user. When the device is activated, the strands are ejected away from the user in a multi-directional pattern. A rescuer may then pull on one of the exposed strands to exactly locate the victim. The activation element may include a combustible propellant, an explosive charge, or compressed source of gas integrated within the canister.

U.S. Patent Application Publication No. 2003/0126774 to Lim et al, entitled "Wind indicator", is directed to a wind indicator. The indicator includes a body with a frame including a spindle axis and a web. A pivot connected to the frame permits the body to rotate about a pivot axis. A spindle disposed on the spindle axis is rotatable about the spindle axis. The spindle includes first and second hubs, each of which include a central body portion and at least one vane support receiving element. At least one element connects the first hub to the second hub to maintain the two hubs in positional relation with respect to one another. At least one vane extends between the vane support receiving elements on the two hubs. The vane captures air movement and translates it into rotational movement of the spindle.

SUMMARY OF THE DISCLOSED TECHNIQUE

In accordance with one aspect of the disclosed technique, there is thus provided a wind parameter indication device for providing wind speed and wind direction. The device is operable for being deployed along an aerial trajectory toward a ground surface. The device includes an anemometer, an altimeter, a compass, a processor, and a transmitter. The processor is coupled with the anemometer, with the altimeter, with the compass, and with the transmitter. The anemometer is operative to obtain local wind speed and local wind direction measurements along the trajectory. The altimeter is operative to obtain altitude measurements along the trajectory. The compass is operative to obtain direction measurements along the trajectory. The processor is operative to determine a wind speed value and wind direction value associated with a predetermined altitude of the device. The transmitter is operative to transmit the wind speed value and the wind direction value to a remotely located receiver. The device may be ejected from an aircraft while in flight. The device may further include an accelerometer, operative to obtain acceleration measurements along the trajectory. The device may further include a housing, enclosing the anemometer, the altimeter, the compass, the processor, and the transmitter. The device may further include a stabilizing decelerator, coupled with the housing. The stabilizing decelerator is operative to stabilize and decelerate the device along the trajectory. The stabilizing trajectory may be a tubular hollow sleeve or a parachute. The anemometer may include a propeller, operative for measuring wind speed, and a wing, operative for aligning along the wind direction. The anemometer may include a wind vane, a propeller anemometer, a windsock, a pitot tube, a tube anemometer, a plate anemometer, a sonic anemometer, a laser Doppler anemometer, a ping-pong ball anemometer, a global positioning system (GPS), and/or a smoke grenade. The transmitter may transmit a plurality of wind speed values and a plurality of wind direction values to the receiver. The transmitter may transmit data continuously to the receiver. The transmitter may transmit the wind speed value and the wind direction value to the receiver after the device has reached the ground surface. The device may further include a timer, operative to delay the deployment of selected components of the device. The device may further include a clock, operative to establish a timestamp for the measurements. The device may further include an additional measurement instrument, such as a thermometer, a barometer, a GPS, a radiation detector, a smoke detector, a smoke density meter, and/or a device for detecting or measuring chemical or biological toxic agents. The device may further include a GPS, operative to determine location coordinates of the device. The device may further include a light source, operative to facilitate locating the device upon landing. The device may further include an additional mass disposed within the housing, operative to stabilize the housing along the trajectory. The housing may be floatable in water.

In accordance with another aspect of the disclosed technique, there is thus provided a wind parameter indication system, including at least one wind parameter indication device of the disclosed technique, and at least one receiver unit, operative to receive the wind speed value and wind direction value obtained by the device. The receiver unit may further include a display, operative to provide a visual indication of the wind speed value and the wind direction value. The receiver unit may further include a speaker, operative to provide an audible indication of the wind speed value and the wind direction value. The receiver unit may further include a tactile feedback device, operative to provide tactile feedback to an operator of the device. The receiver unit may further include a compass, operative to obtain direction measurements of the receiver unit. The receiver unit may further include an input interface, operative to enable an operator to provide instructions to the receiver unit. The device may be deployed from an aircraft in proximity to a desired landing point, and the receiver unit may be onboard the aircraft, where the wind speed value and wind direction value are utilized to assist the landing of the aircraft. The aircraft may be a helicopter.

In accordance with a further aspect of the disclosed technique, there is thus provided a method for providing an indication of wind speed and wind direction. The method includes the procedure of deploying a wind parameter indication device along an aerial trajectory toward a ground surface, the device including an anemometer, an altimeter, a compass, a transmitter, and a processor. The method further includes the procedures of obtaining local wind speed and local wind direction measurements along the trajectory, using the anemometer, obtaining altitude measurements along the trajectory using the altimeter, and obtaining direction measurements along the trajectory using the compass. The method further includes the procedures of determining a wind speed value and a wind direction value associated with a predetermined altitude of the device, using the processor, and transmitting the wind speed value and the wind direction value to a remotely located receiver, using the transmitter.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a novel wind parameter indication device and a novel wind parameter indication system that includes the device and a receiver unit. The wind parameter indication device is deployed along an aerial trajectory, such as by being ejected from an aircraft during flight, and provides wind parameter measurements, such as the wind speed and the wind direction, as the device is falling toward the ground. Selected wind parameter values may be transmitted from the wind parameter indication device to a remotely located receiver unit. The wind parameter indication system may be utilized for aircraft landing assistance, firefighting, and other potential applications.

Figure 1:
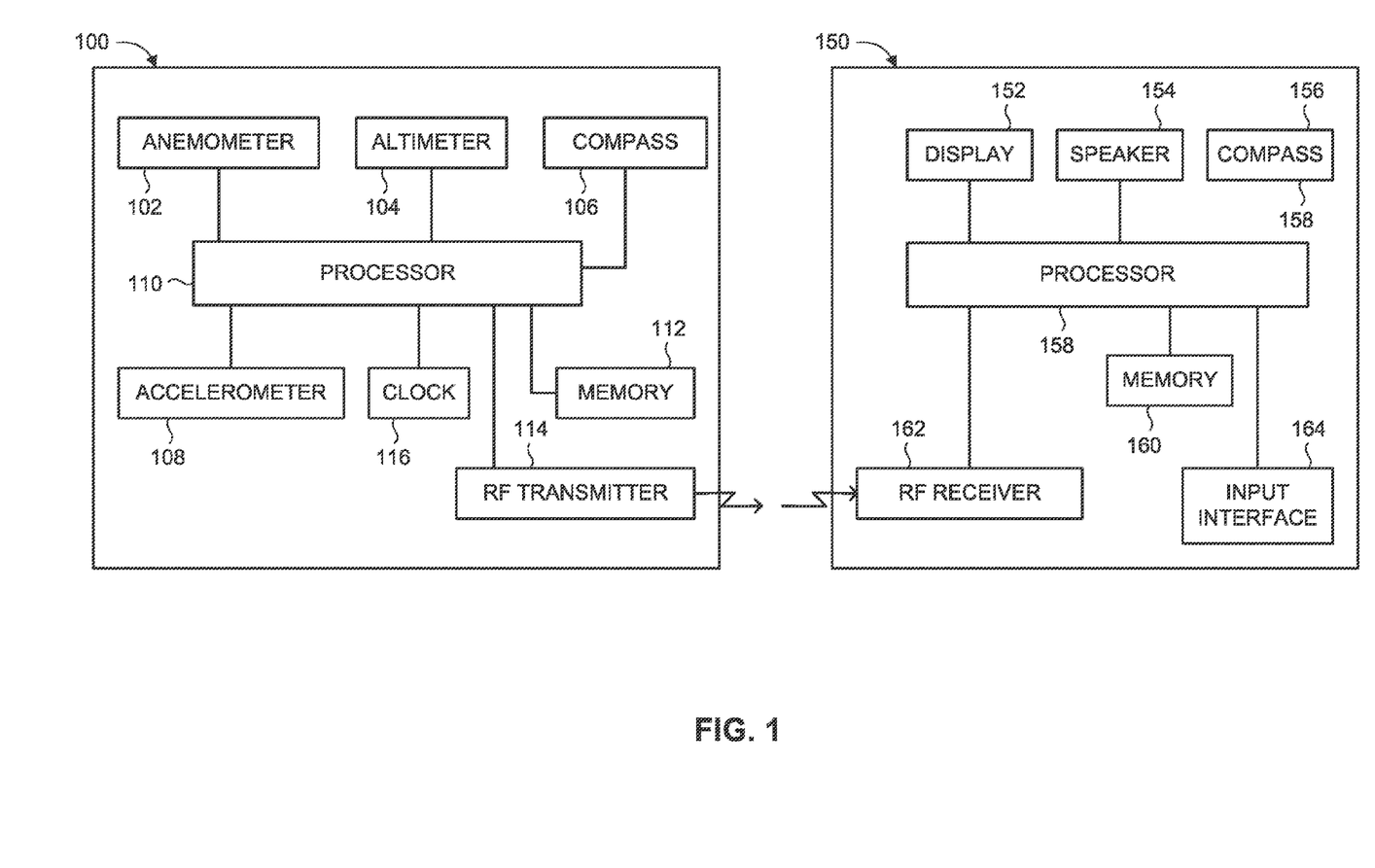
FIG. 1 is a block diagram of a wind parameter indication system, constructed and operative in accordance with an embodiment of the disclosed technique.

Reference is now made to FIG. 1, which is a block diagram of a wind parameter indication system, constructed and operative in accordance with an embodiment of the disclosed technique. The wind parameter indication system includes a wind parameter indication device 100 and a receiver unit 150. Wind parameter indication device (WPID) 100 includes an anemometer 102, an altimeter 104, a compass 106, an accelerometer 108, a processor 110, a memory 112, a radio frequency (RF) transmitter 114, and a clock 116. Processor 110 is coupled with anemometer 102, with altimeter 104, with compass 106, with accelerometer 108, with memory 112, with RF transmitter 114, and with clock 116. Receiver unit 150 includes a display 152, a speaker 154, a compass 156, a processor 158, a memory 160, an RF receiver 162, and an input interface 164. Processor 158 is coupled with display 152, with speaker 154, with compass 156, with memory 160, with RF receiver 162, and with input interface 164.

Anemometer 102 is operative for measuring at least the wind speed and the wind direction in the surrounding area. The term "anemometer" as used herein refers to any type of device, instrument or technique that includes at least one device or instrument for obtaining wind speed measurements and at least one device or instrument for obtaining wind direction measurements. Anemometer 102 may include at least one wind parameter measurement instrument known in the art, including but not limited to: a wind vane, a propeller anemometer, a windsock, a pitot tube, a tube anemometer, a plate anemometer, a sonic anemometer, a laser Doppler anemometer, a ping-pong ball anemometer, and the like.

Altimeter 104 is operative for measuring altitude. The term "altimeter" as used herein refers to any type of device, instrument or technique for obtaining measurements of the altitude of an object with respect to a reference level. Altimeter 104 may be embodied for example by a pressure or barometric altimeter, a radar altimeter, a laser rangefinder, a sonic altimeter, and the like.

Compass 106 is operative for measuring direction with respect to a reference coordinate system. The term "compass" as used herein refers to any type of device, instrument or technique for indicating directions in a frame of reference that is stationary relative to the surface of the earth. Compass 106 may be embodied for example by a magnetic compass, a gyrocompass, an electronic compass (e.g., a magnetometer or a fiber optic gyrocompass), and the like.

Accelerometer 108 is operative for measuring acceleration. The term "accelerometer" as used herein refers to any type of device, instrument or technique for obtaining measurements of proper acceleration, or acceleration of an inertial reference frame relative to itself. Accelerometer 108 may be embodied for example by a piezoelectric accelerometer, a microelectromechanical systems (MEMS) accelerometer, a strain gauge accelerometer, a laser accelerometer, and the like.

Memory 112 is operative for program and data storage. Clock 116 is operative for measuring or recording the time or duration of an event, such as by providing a timestamp for other measurements (e.g., including a date and a time at which the measurement occurred). RF transmitter 114 is operative for transmitting an RF signal to a corresponding receiver, such as RF receiver 162. It is noted that the transmitted/received signal may alternatively be another type (i.e., not necessarily RF) or in other frequency ranges in the electromagnetic spectrum. For example, WPID 100 may alternatively include an optical transmitter, for transmitting an optical signal to an optical receiver. WPID 100 further includes a power source (not shown), for providing required power to relevant components.

According to an embodiment of the disclosed technique, the wind parameter indication system may be used for landing assistance, particularly when landing an aircraft, such as a helicopter, at a remote location where necessary landing information for the pilot may not be immediately available from external sources (e.g., an aircraft control tower). Accordingly, when the aircraft is in sufficient proximity to the desired landing point, the aircraft pilot (or another passenger in the aircraft) ejects WPID 100 from the aircraft, causing WPID 100 to fall through the air toward the ground. WPID 100 acquires the various measurements and determines wind speed/direction values associated with a predetermined altitude, as discussed hereinbelow. WPID 100 transmits the determined wind parameter values (via RF transmitter 114) to receiver unit 150, which is located on the aircraft. The aircraft pilot obtains the wind parameter values from receiver unit 150 (e.g., by viewing them on display 152), and takes the data into account in order to implement the aircraft landing in a safe and secure manner. It is noted that all the necessary measurements and subsequent processing is performed by WPID 100 using onboard components which operate independently of additional external devices or data sources. In particular, anemometer 102, altimeter 104, compass 106, and accelerometer 108, acquire their respective measurements independently, without requiring any additional sources that are external to (e.g., remotely located from) WPID 100, such that WPID 100 operates in a self-sufficient manner.

Figure 2:
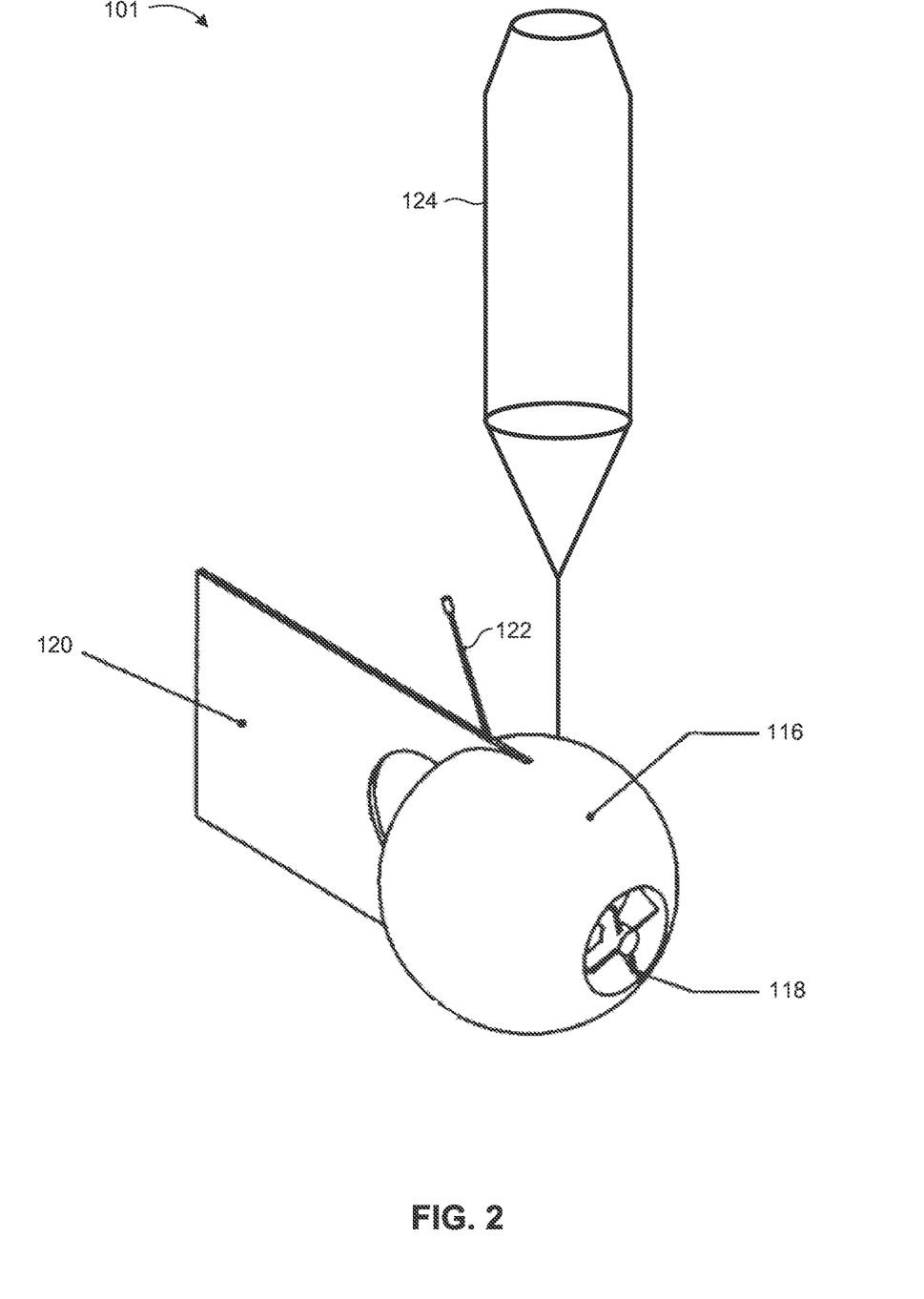
FIG. 2 is a perspective view schematic illustration of a wind parameter indication device, constructed and operative in accordance with an embodiment of the disclosed technique.

Reference is now made to FIG. 2, which is a perspective view schematic illustration of a wind parameter indication device, generally referenced 101, constructed and operative in accordance with an embodiment of the disclosed technique. WPID 101 includes a housing 116, in which the various components (e.g., altimeter 104, compass 106, accelerometer 108, processor 110) are securely contained. Housing 116 may be spherical (as depicted in FIG. 2), although housing 116 may alternatively be a different shape. Housing 116 may be made of any suitable material (e.g., a polycarbonate), but generally may be of a material that provides durability and the ability to withstand continual exposure to an outdoor environment, particularly inclement weather conditions (e.g., rain, snow, and other types of precipitation), as well as the ability to withstand a forceful impact (e.g., upon landing). Housing 116 may also be designed (e.g., size, shape, material, and other relevant features) in order to provide particular aerodynamic characteristics, such as the capacity to effectively follow a desired aerial trajectory. Housing 116 may also be floatable in water, to ensure that WPID 101 may operate after deployment over a lake or other body of water. WPID 101 includes a propeller 118 and a wing 120, which function for enabling the measurements of wind speed and wind direction, respectively. Propeller 118 is disposed within a circular opening at the perimeter of housing 116. Wing 120 extends outward from the edge of housing 116, such that the flat surface of wing 120 is aligned substantially vertically (i.e. perpendicular to the rotational plane of propeller 118, to ensure wind flow along the propeller rotational axis). It is appreciated that other suitable arrangements and configurations for anemometers and associated devices with respect to a housing 116 of WPID 101 are also within the scope of the disclosed technique. WPID 101 further includes an antenna 122, associated with RF transmitter 114 (FIG. 1), to enable transmission of the RF signal. WPID 101 further includes a stabilizing decelerator 124, elaborated upon further hereinbelow.

The operation of WPID 101 involves its deployment along an aerial trajectory toward a ground surface. According to an embodiment of the disclosed technique, WPID 101 is ejected from an aircraft, such as a helicopter, by an individual while the aircraft is in flight. The ejection may be implemented manually (e.g., the WPID is thrown by the pilot or another passenger of the aircraft) or automated (e.g., the WPID is fired out via a projectile firing mechanism). It is appreciated that WPID 101 may generally be deployed along the aerial trajectory toward the ground by any suitable means, such as by simply dropping WPID 101 from a particular height (resulting in its free fall motion under gravity). It is further appreciated that the ground surface, upon which WPID 101 eventually lands upon completion of its aerial trajectory, encompasses any type of surface and terrain, including the surface of a body of water (e.g., a lake), the surface of a platform or other structure on the ground, and the like.

While WPID 101 is falling downwards, anemometer 102 continuously (e.g., repeatedly) acquires wind speed and wind direction measurements, altimeter 104 continuously (e.g., repeatedly) acquires altitude measurements, and compass 106 continuously (e.g., repeatedly) acquires directional measurements, and accelerometer 108 continuously (e.g., repeatedly) acquires acceleration measurements. For example, the wind speed is calculated based on the angular rotation velocity of propeller 118, while wind direction is determined based on the orientation of wing 120 and the readings of compass 106 (e.g., compass 106 provides a continuous indication of which direction the wing 120 is facing, and thus a continuous indication of the wind direction). The different measurements are stored in memory 112, such that corresponding measurements are linked with one another (e.g., using a suitable database). For example, each of the stored measurements may be associated with a timestamp corresponding to when the respective measurement was obtained.

Processor 110 determines a wind speed value and wind direction value (referred to herein as "final values") associated with a predetermined altitude. Once the final values have been determined, they are transmitted to receiver unit 150 via RF transmitter 104. For example, the predetermined altitude may be selected to be approximately 10 m above the ground. Accordingly, processor 110 determines the wind speed measurement and wind velocity measurement associated with the altitude measurement that substantially corresponds to the altitude of 10 meters (m) above the ground. Although altimeter 104 provides altitude measurements in absolute terms (e.g., relative to sea level or "mean sea level (MSL)" measurements), and the absolute altitude of the "ground" is dependent on the geographic location of the actual landing point, which is not necessarily known in advance, the required predetermined altitude may nevertheless be obtained using accelerometer 108. In particular, accelerometer 108 provides an indication of when WPID 101 has reached the ground (e.g., when there is a substantial change in the accelerometer reading over a brief duration). Processor 110 may then assign a reference altitude (i.e., a "ground level altitude") to the previously obtained altimeter measurement with the substantially same timestamp as the ground level acceleration. Subsequently, processor 110 can retroactively determine the altitude measurement corresponding to the predetermined altitude (e.g., 10 m above the ground level altitude), and then determine the wind speed measurement and wind direction measurement obtained at the substantially same time as the predetermined altitude measurement. Alternatively, processor 110 may retroactively determine the predetermined altitude measurement based solely on altimeter 104 (e.g., the ground level altitude is considered to have been reached when altimeter 104 ceases to provide successive readings that are distinct in value). It is appreciated that the final values may be determined by alternative means, such as by utilizing a global positioning system (GPS) to associate the absolute altitude of the ground at the landing point with the predetermined altitude.

WPID 101 may alternatively provide a number of different values to receiver unit 150 (i.e., rather than just a single (final value) of wind speed and wind direction). For example, WPID 101 may transmit continuous wind parameter measurements to receiver unit 150, or may transmit wind parameter measurements corresponding to intermittent altitude levels (e.g., every 5 m). WPID 101 may transmit to receiver unit 150 in real-time (i.e., immediately after the wind parameter measurements are acquired), or alternatively, WPID 101 may begin transmitting only after it has landed (i.e., terminated its aerial trajectory). It is noted that after landing, WPID 101 may transmit to receiver unit 150 any of the previously acquired data, which is stored in memory 112.

Referring to FIG. 2, stabilizing decelerator 124 serves to provide stability to WPID 101 along its aerial trajectory to ensure that WPID 101 lands in a desired orientation (e.g., such that the surface of wing 120 is perpendicular to the ground upon landing). Stabilizing decelerator 124 further serves to slow the downward motion of the falling WPID 101, in order to provide adequate time for obtaining the required measurements (i.e., by producing sufficient air resistance or drag). Stabilizing decelerator 124 may be embodied by a tubular hollow "sleeve" made of fabric, which is connected to housing 116 via a suitable strap or cable, such that housing 116 is vertically suspended from stabilizing decelerator 124 as it is falling toward the ground (as depicted in FIG. 2). WPID 101 optionally includes an additional mass disposed within housing 116, in order to stabilize housing 116 along its trajectory and to ensure that housing 116 is maintained on the bottom of WPID 101 (i.e., below stabilizing decelerator 124) until it lands. This additional mass/weight may be embodied by the power source (e.g., batteries) contained within housing 116. It is appreciated that stabilizing decelerator 124 is optional, and the disclosed technique is also applicable to a WPID without means for providing the aforementioned stabilization and/or deceleration as the WPID follows its downwards trajectory.

WPID 100 may include additional measurement instruments or devices for measuring other parameters, which are also provided to receiver unit 150. For example, WPID 100 may include a thermometer for measuring temperature, a barometer for measuring pressure, a global positioning system (GPS) for providing geographic location, a radiation detector for detecting or measuring radiation, a smoke detector for detecting smoke, a smoke density reader for measuring smoke density, a device for detecting or measuring chemical or biological toxic agents, and the like. It is noted that a GPS may be utilized to obtain wind parameter measurements by defining the starting point coordinates and ending point coordinates of the aerial trajectory of WPID 101, where the effect of the wind on the actual trajectory is then calculated to obtain an indication of the relevant wind parameters. Accordingly, a GPS may be used to compensate or correct the wind parameter measurements obtained by anemometer 102 based on the deviation of the downward trajectory of WPID 100 from an ideal vertical path (i.e., as a result of the wind acting upon it, among other factors). WPID 100 may also include a smoke grenade or alternate type of dispenser of airborne fragments (such as solid or liquid particles). Accordingly, a wind direction measurement may be obtained by dispersing the fragments into the atmosphere and observing the direction in which the fragments are carried out by the wind. WPID 100 may optionally include a timer, for delaying the deployment of certain components or features of WPID 100 (e.g., to delay the opening of stabilizing decelerator 124 or the activation of propeller 118 or wing 120) until a particular duration has elapsed after WPID 100 is ejected from the aircraft, in order to avoid potential malfunctioning issues, for example to ensure that WPID 100 does not inadvertently get drawn into the aircraft engine rotors. WPID 100 may optionally include a light source, such as a strobe light or flashing LED, in order to facilitate locating WPID 100 after its landing.

Figure 3:
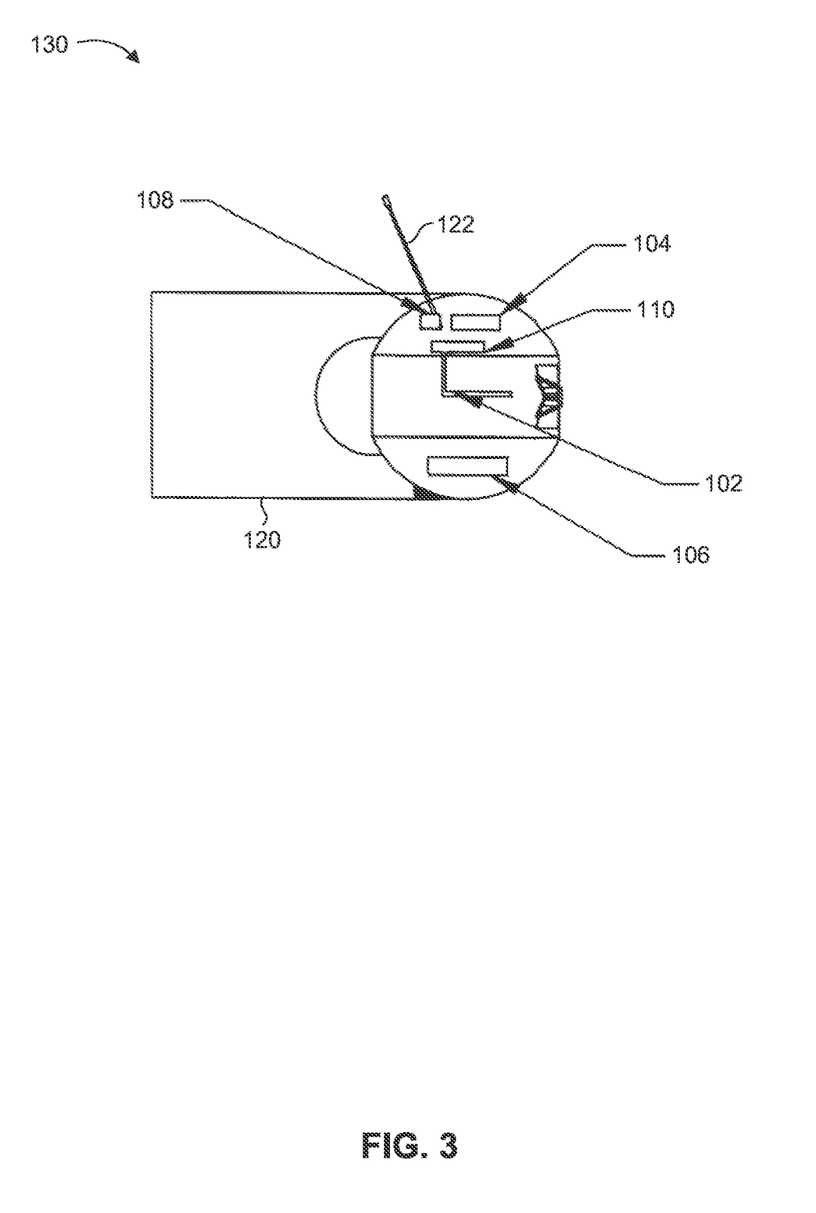
FIG. 3 is a cross-sectional side view schematic illustration of a wind parameter indication device with a pitot tube anemometer, constructed and operative in accordance with a further embodiment of the disclosed technique.

WPID 100 may include any type of independent anemometer (i.e., that operates independent of additional external sources to obtain the relevant wind measurements) or associated components for providing wind parameter measurements, in any suitable arrangement. Reference is now made to FIG. 3, which is a cross-sectional side view schematic illustration of a wind parameter indication device, generally referenced 130, with a pitot tube anemometer 102, constructed and operative in accordance with a further embodiment of the disclosed technique.

Figure 4:
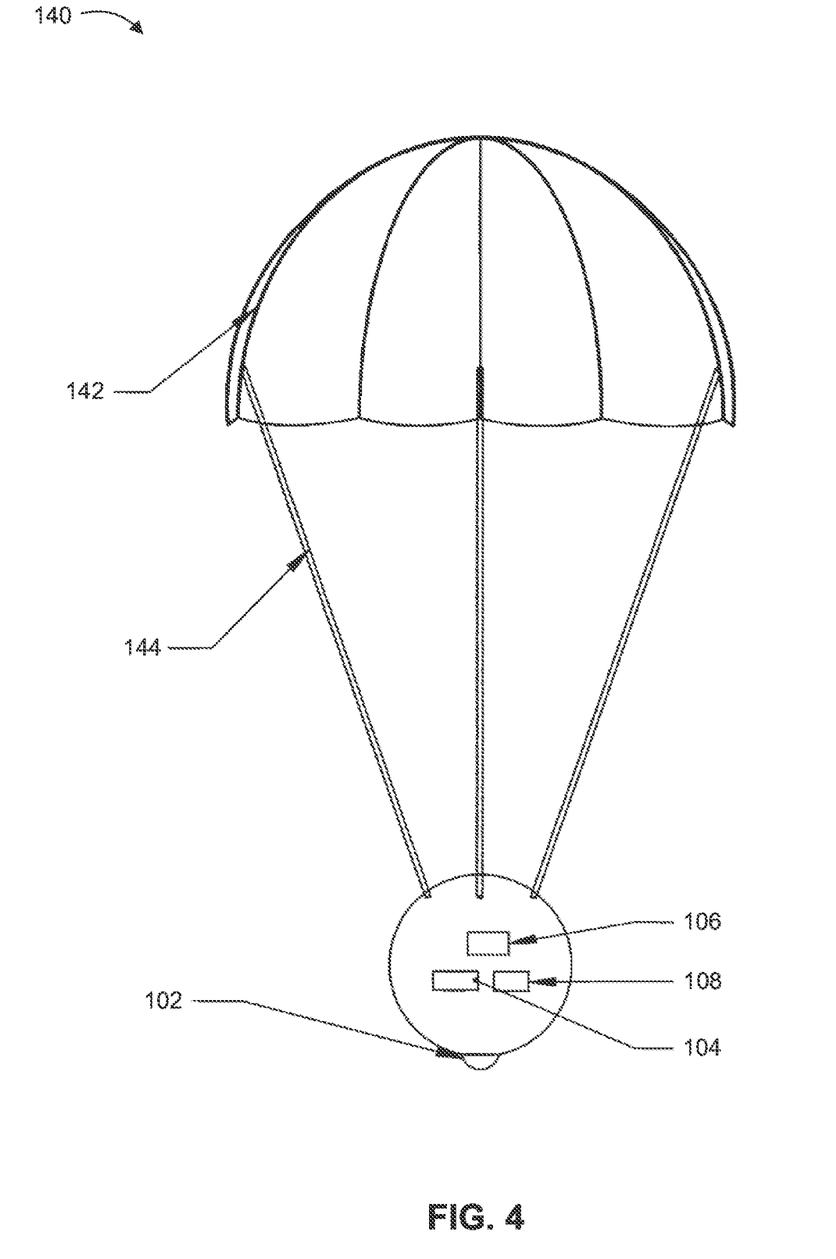
FIG. 4 is a side view schematic illustration of a wind parameter indication device with a parachute, constructed and operative in accordance with yet another embodiment of the disclosed technique.

Stabilizing decelerator 124 may be embodied by a parachute. Reference is now made to FIG. 4, which is a side view schematic illustration of a wind parameter indication device, generally referenced 140, with a parachute, referenced 142, constructed and operative in accordance with yet another embodiment of the disclosed technique. Housing 116 is vertically suspended from parachute 142 via parachute straps 144, as WPID 140 falls down along its aerial trajectory. While a parachute may be more susceptible to wind effects compared to other types of decelerators (such as the tubular sleeve of FIG. 2) and may result in greater variability in the aerial trajectory and eventual landing point, a parachute also may allow for reuse.

Figure 5A:
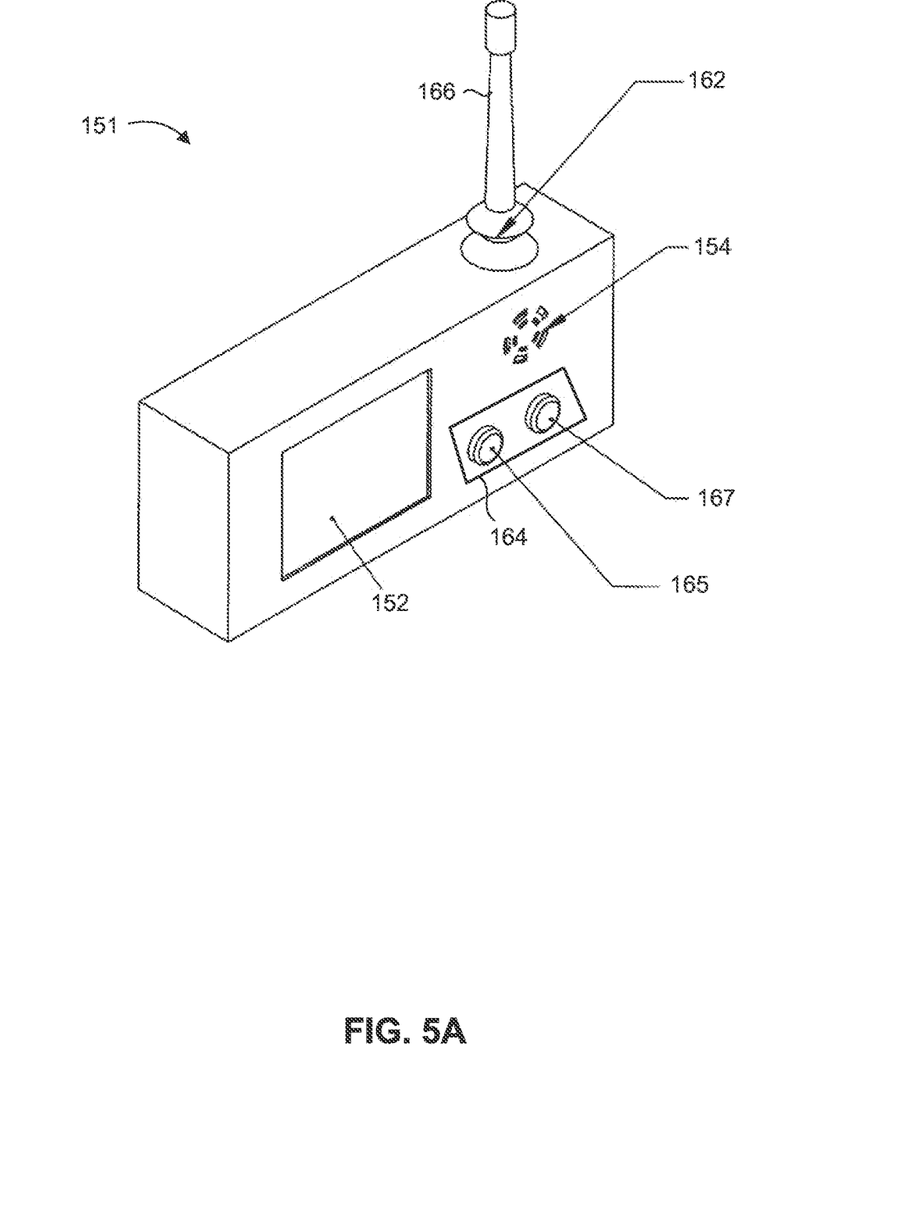
FIG. 5A is a perspective view schematic illustration of a receiver unit, constructed and operative in accordance with an embodiment of the disclosed technique.
Figure 5B:
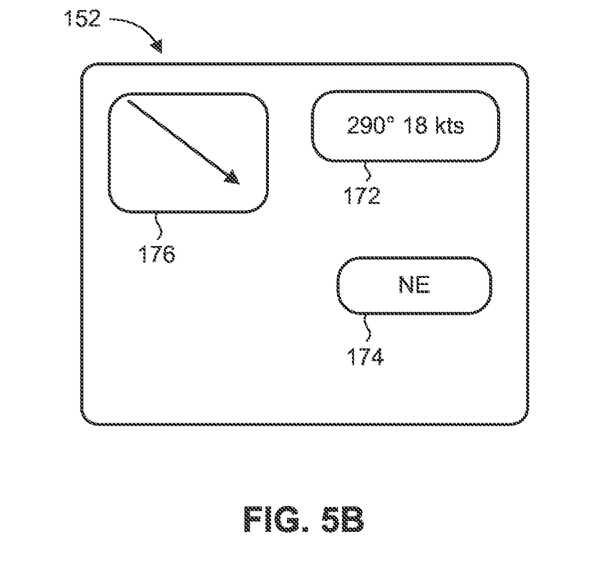
FIG. 5B is a schematic illustration of the display of the receiver unit of FIG. 5A, constructed and operative in accordance with an embodiment of the disclosed technique.

WPID 100 transmits the final values of the wind parameter measurements (e.g., the values associated with the predetermined altitude) to receiver unit 150 (FIG. 1). Reference is now made to FIGS. 5A and 5B. FIG. 5A is a perspective view schematic illustration of a receiver unit 151, constructed and operative in accordance with an embodiment of the disclosed technique. FIG. 5B is a schematic illustration of the display 152 of the receiver unit 151 of FIG. 5A, constructed and operative in accordance with an embodiment of the disclosed technique. Display 152 provides a visual indication of the final wind parameter values. The information may be displayed in any suitable format, and/or simultaneously in a number of different formats, in order to facilitate comprehension by the viewer. For example, window 172 may display the relative direction of the wind (e.g., relative to a current direction of receiver unit 150) and the current speed of the wind in text form: "WIND DIRECTION: 290°; WIND SPEED: 18 knots". Window 174 may display the wind direction relative to a standard navigational frame of reference (i.e., with respect to the four cardinal directions) in text form: "WIND DIRECTION: NE (Northeast)". Window 176 may display the wind direction relative to a standard navigational frame of reference in a graphical format, i.e., via an arrow that points toward the wind direction (away from the direction from which the wind originates). Display 152 may also display any other additional parameters (e.g., temperature, air pressure, global location, time and date of associated measurements) which are obtained by measurement instruments of receiver unit 150 and/or which are received by receiver unit 150 from WPID 100. The operator of receiver unit 151 may select between different viewing modes or display formats using input interface 164 (shown with two buttons 165 and 167 in FIG. 5A for illustrative purposes). For example, the operator may select a different type of graphical icon to be presented in display window 176 instead of an arrow, such as an icon of a windsock pointing toward the current wind direction. Alternatively, the operator may choose to display a relevant image, such as an airport runway depicting recommended landing regions and landing instructions based on the wind parameter values. The operator may also use input interface 164 to toggle between alternative text formats that may be displayed, such as to shift between different measurement units (e.g., to convert between miles and kilometers). Input interface 164 also allows the operator to provide instructions to WPID 101 and/or to receiver unit 150, such as the ability to define a predetermined altitude at which the wind parameter measurements are desired.

Receiver unit 151 further includes an optional speaker 154 (e.g., in addition to or instead of display 152), for providing an audible indication of the final wind parameter values. For example, speaker 154 may produce an audio message stating the final wind speed value and final wind direction value as a verbal message. Speaker 154 may also be directed to produce a particular audible sound (e.g., a warning beep) if the wind speed and/or wind direction exceeds a predefined threshold value. Receiver unit 151 may further alternatively include a tactile feedback device (not shown), such as a vibrating unit, for providing tactile feedback, in addition to or instead of visual feedback or audio feedback.

Figure 5C:
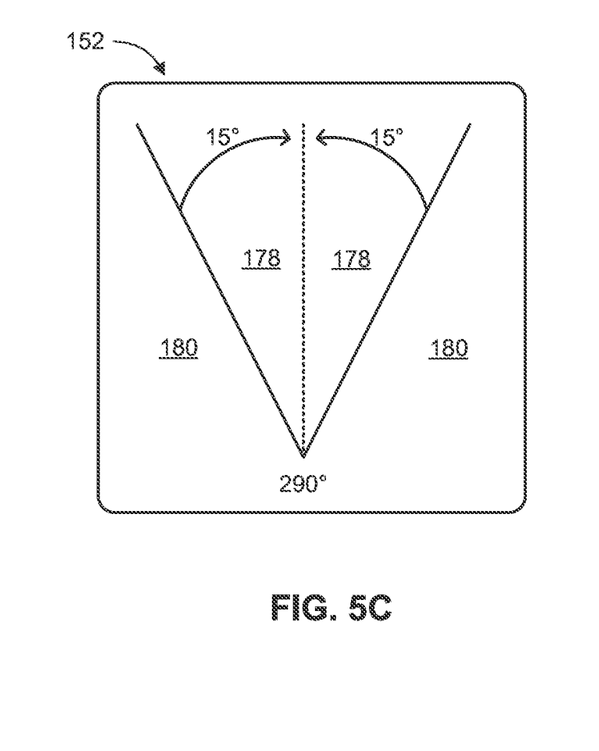
FIG. 5C is a schematic illustration of a display showing angular boundaries with respect to a recommended flight path, constructed and operative in accordance with another embodiment of the disclosed technique.

The operator of receiver unit 151 may receive a combination of different forms of feedback to indicate a particular event or a series of possible events. For example, if the operator is a pilot landing an aircraft, receiver unit 151 may provide the pilot with feedback if and by how much the aircraft is currently deviating from a recommended flight path. Reference is now made to FIG. 5C, which is a schematic illustration of a display showing angular boundaries with respect to a recommended flight path, constructed and operative in accordance with another embodiment of the disclosed technique. A recommended flight path to be followed by the aircraft corresponds to the current wind direction of 290°, which is depicted by the dotted vertical line in FIG. 5C. The pilot may establish a predefined margin on either side of the recommended flight path, such as a 15° angular boundary on either side, depicted by the solid diagonal lines in FIG. 5C. Accordingly, receiver unit 151 may provide the pilot with visual, audio and/or tactile feedback to indicate various possible flight path deviations. For example, if the aircraft deviates slightly from the recommended flight path but stays within the 15° angular boundaries (i.e., remains within regions 178), then display 152 may display a first color and/or speaker 154 may sound a first tone and/or the tactile feedback unit may vibrate at a first frequency. Correspondingly, if the aircraft deviates largely from the recommended flight path and strays outside the 15° angular boundaries (i.e., into regions 180), then display 152 may display a second color and/or speaker 154 may sound a second tone and/or the tactile feedback unit may vibrate at a second frequency.

Receiver unit 151 further includes a compass 156, which provides the current direction with respect to a reference coordinate system (similar to compass 106 of WPID 100). Compass 156 provides direction measurements of receiver unit 151, in order to provide a frame of reference for the received wind direction value. Receiver unit 151 includes an antenna 166, associated with RF transmitter 162, to enable reception of the transmitted RF signal.

Receiver unit 150 may be a stand-alone detached unit, or may be integrated (partially or fully) with another system or apparatus. For example, receiver unit 150 may be integrated with existing control systems or units of the piloted aircraft, e.g., display 152 may be integrated with the aircraft head-up display (HUD), and RF receiver 162 may be integrated with an existing aircraft receiver. Alternatively, receiver unit 150 may be worn by the pilot, such as in the form of a watch or other wearable configuration. Further alternatively, receiver unit 150 may be integrated with a mobile communication device, such as a smartphone or a tablet computer.

WPID 100 may transmit the final wind parameter values to multiple receiver units 150 simultaneously. For example, the pilot of one aircraft may deploy a single WPID 100, which then transmits the wind parameter values at the surrounding area to a number of different receiver units 150, each of which is located onboard a respective aircraft that may be landing at a landing point in that area. Conversely, a single receiver unit 150 may receive final wind parameter values from multiple WPIDs 100 simultaneously. For example, an aircraft pilot may be considering multiple potential landing points, and may then deploy a number of WPIDs 100 in the vicinity of each landing area being considered. The pilot may receive the various wind parameter values at a receiver unit 150 located onboard the aircraft, and then select an optimal landing point accordingly. According to an embodiment the disclosed technique, multiple WPIDs may be associated with a unique tag, such as an identification number, such that a receiver unit can distinguish between the data received from each of the multiple WPIDs. For example, the uniquely tagged WPIDs and receiver units may be integrated together in a single kit, and then employed in conjunction by an operator of the kit.

It is appreciated that WPID 100 may transmit data to a receiver unit 150 located a substantially large distance away (e.g., 10 km), and without requiring a direct line-of-sight between the RF transmitter 114 and RF receiver 162. It is further appreciated that the WPID of the disclosed technique may be deployed in a wide range of geographical locations and weather conditions (e.g., daytime or nighttime, during rain, fog, snow or precipitation, near rugged terrain or bodies of water, and the like), and nevertheless provide the required wind parameter values. The WPID of the disclosed technique may be reusable for multiple deployments, or may be disposable (single-use).

The wind parameter indication system of the disclosed technique may be used for other applications. For example, in the event of a forest fire, the wind parameter indication device may provide firefighters and rescue personnel at the scene with an accurate indication of the local wind parameters where the fire is located, as such wind parameters may be otherwise difficult to obtain due to the heavy smoke at the location. The wind parameter indication device may also provide other useful parameters, such as the smoke density (e.g., via a smoke density meter), or an indication of safe/unsafe landing locations (e.g., using a GPS). The information may then be utilized to assist the firefighting and rescue efforts.

In accordance with the disclosed technique, a method for providing an indication of wind parameters includes the procedures of: deploying a wind parameter indication device along an aerial trajectory toward a ground surface, the device including an anemometer, an altimeter, a compass, a transmitter, and a processor; obtaining local wind speed and local wind direction measurements along the trajectory, using the anemometer; obtaining altitude measurements along the trajectory, using the altimeter; obtaining direction measurements along the trajectory, using the compass; determining a wind speed value and a wind direction value associated with a predetermined altitude of the device, using the processor; and transmitting the wind speed value and the wind direction value to a remotely located receiver, using the transmitter.

It will be appreciated by persons skilled in the art that the disclosed technique is not limited to what has been particularly shown and described hereinabove.

The invention claimed is:

1. A wind parameter indication device for providing wind speed and wind direction to a remotely located receiver, wherein said device is ejected in midair to fall along an aerial trajectory from a landing approach height until a ground surface, wherein said device operates independently of external data sources, said device comprising:
   a compass, operative to continuously obtain direction measurements along said trajectory;
   an anemometer, operative to continuously obtain local wind speed and local wind direction measurements along said trajectory using the direction measurements obtained by said compass;
   an altimeter, operative to continuously obtain altitude measurements along said trajectory;
   an accelerometer, operative to obtain acceleration measurements along said trajectory;
   a processor, coupled with said anemometer, with said altimeter, with said accelerometer, and with said compass, said processor operative to determine the altitude measurement corresponding to at least one predetermined altitude of said device relative to said ground surface, after said device has reached said ground surface, and then to determine a wind speed value and a wind direction value associated with said at least one predetermined altitude based on the obtained measurements; and
   a transmitter, coupled with said processor, said transmitter operative to transmit said wind speed value and said wind direction value associated with said at least one predetermined altitude to said remotely located receiver.

2. The wind parameter indication device of claim 1, wherein said device is ejected from an aircraft while in flight.

3. The wind parameter indication device of claim 1, further comprising a housing, enclosing said anemometer, said altimeter, said accelerometer, said compass, said processor and said transmitter.

4. The wind parameter indication device of claim 3, further comprising a stabilizing decelerator, coupled with said housing, said stabilizing decelerator operative to stabilize and decelerate said device along said trajectory.

5. The wind parameter indication device of claim 1, wherein said anemometer comprises a propeller, operative for measuring wind speed, and a wing, operative for aligning along said wind direction.

6. The wind parameter indication device of claim 1, wherein said anemometer is selected from the group consisting of:
   a wind vane;
   a propeller anemometer;
   a windsock;
   a pitot tube;
   a tube anemometer;
   a plate anemometer;
   a sonic anemometer;
   a laser Doppler anemometer;
   a ping-pong ball anemometer;
   a smoke grenade; and
   any combination thereof.

7. The wind parameter indication device of claim 1, wherein said transmitter transmits a plurality of wind speed values and a plurality of wind direction values to said receiver.

8. The wind parameter indication device of claim 7, wherein said transmitter transmits data continuously to said receiver.

9. The wind parameter indication device of claim 1, wherein said transmitter transmits said wind speed value and said wind direction value to said receiver after said device has reached said ground surface.

10. The wind parameter indication device of claim 1, further comprising a timer, operative to delay deployment of selected components of said device.

11. The wind parameter indication device of claim 1, further comprising a clock, operative to establish a timestamp for said measurements.

12. The wind parameter indication device of claim 1, further comprising a measurement instrument selected from the group consisting of:
   a thermometer;
   a barometer;
   a global positioning system (GPS);
   a radiation detector;
   a smoke detector;
   a smoke density meter;
   a device for detecting or measuring chemical or biological toxic agents; and
   any combination thereof.

13. The wind parameter indication device of claim 1, further comprising a global positioning system (GPS), operative to determine location coordinates of said device, and to compensate or correct said local wind speed and local wind direction measurements obtained by said anemometer, based on deviation of a downward trajectory of said device from an ideal vertical path.

14. The wind parameter indication device of claim 1, further comprising a light source, operative to facilitate locating said device upon landing.

15. A wind parameter indication system, comprising;
   at least one wind parameter indication device as in claim 1, and
   at least one receiver unit, operative to receive said wind speed value and said wind direction value associated with said at least one predetermined altitude from said device.

16. The wind parameter indication system of claim 15, wherein said receiver unit further comprises a display, operative to provide a visual indication of said wind speed value and said wind direction value.

17. The wind parameter indication system of claim 15, wherein said receiver unit further comprises a speaker, operative to provide an audible indication of said wind speed value and said wind direction value.

18. The wind parameter indication system of claim 15, wherein said wind parameter indication device is deployed from an aircraft when approaching a desired landing point, and wherein said receiver unit is onboard said aircraft, said wind speed value and said wind direction value being utilized to assist the landing of said aircraft.

19. The wind parameter indication system of claim 18, wherein said aircraft is a helicopter.

20. A method for providing an indication of wind speed and wind direction to a remotely located receiver, the method comprising the procedures of;
   ejecting a wind parameter indication device in midair to fall along an aerial trajectory from a landing approach height until a ground surface, wherein said device operates independently of external data sources, said device comprising: an anemometer, an altimeter, a compass, an accelerometer, a transmitter, and a processor;

continuously obtaining direction measurements along said trajectory, using said compass;

continuously obtaining local wind speed and local wind direction measurements along said trajectory using the direction measurements obtained by said compass, using said anemometer;

continuously obtaining altitude measurements along said trajectory, using said altimeter;

obtaining acceleration measurements along said trajectory, using said accelerometer;

determining the altitude measurement corresponding to at least one predetermined altitude of said device relative to said ground surface, after said device has reached said ground surface;

determining a wind speed value and a wind direction value associated with said at least one predetermined altitude, based on the obtained measurements, using said processor; and transmitting said wind speed value and said wind direction value associated with said at least one predetermined altitude to said remotely located receiver, using said transmitter.

* * * * *